(12) United States Patent
Luo et al.

(10) Patent No.: US 6,888,370 B1
(45) Date of Patent: May 3, 2005

(54) DYNAMICALLY ADJUSTABLE TERMINATION IMPEDANCE CONTROL TECHNIQUES

(75) Inventors: Mei Luo, San Jose, CA (US); Wilson Wong, San Francisco, CA (US); Sergey Shumarayev, San Leandro, CA (US)

(73) Assignee: Altera Corporation, San Jose, CA (US)

( * ) Notice: Subject to any disclaimer, the term of this patent is extended or adjusted under 35 U.S.C. 154(b) by 34 days.

(21) Appl. No.: 10/645,932

(22) Filed: Aug. 20, 2003

(51) Int. Cl.[7] .......................................... H03K 19/0175
(52) U.S. Cl. ............................ 326/30; 326/21; 326/23; 326/26; 326/77
(58) Field of Search ........................ 326/21–24, 26–27, 326/30

(56) References Cited

U.S. PATENT DOCUMENTS

| | | |
|---|---|---|
| 4,719,369 A | 1/1988 | Asano et al. |
| 4,954,729 A | 9/1990 | Urai |
| 5,111,081 A | 5/1992 | Atallah |
| 5,134,311 A | 7/1992 | Biber et al. |
| 5,164,663 A | 11/1992 | Alcorn |
| 5,179,300 A | 1/1993 | Rolandi et al. |
| 5,359,235 A | 10/1994 | Coyle et al. |
| 5,374,861 A | 12/1994 | Kubista |
| 5,592,510 A | 1/1997 | Van Brunt et al. |
| 5,602,494 A | 2/1997 | Sundstrom |
| 5,623,216 A | 4/1997 | Penza et al. |
| 5,726,582 A | 3/1998 | Hedberg |
| 5,726,583 A | 3/1998 | Kaplinsky |
| 5,764,080 A | 6/1998 | Huang et al. |
| 5,864,715 A | 1/1999 | Zani et al. |
| 5,939,896 A | 8/1999 | Hedberg |

(Continued)

OTHER PUBLICATIONS

Altera, Apex 20K "Programmable Logic Device Family," Altera Corporation, Ver. 1.1, May 2001.
Altera, Apex II "Programmable Logic Device Family," Altera Corporation, Ver. 1.1, May 2001.
Bendak, M. et al. (1996). "CMOS VLSI Implementation of Gigabyte/second computer network links," Dept. of Electrical and Computer Engineering, University of California at San Diego, La Jolla, CA 92093–0407, IEEE *International Symposium on Circuits and Systems* pp. 269–272.

(Continued)

*Primary Examiner*—Anh Q. Tran
(74) *Attorney, Agent, or Firm*—Townsend and Townsend and Crew LLP; Steven J. Cahill

(57) ABSTRACT

The on-chip impedance termination circuits can be dynamically adjusted to match transmission line impedance values. A network of termination resistors on an integrated circuit provides termination impedance to a transmission line coupled to an IO pin. The termination resistors are coupled in series and in parallel with each other. Pass gates are coupled to the resistors. The pass gates are individually turned ON or OFF to couple or decouple resistors from the transmission line. Each pass gate is set to be ON or OFF to provide a selected termination resistance value to the transmission line. The termination resistance of the resistor network can be increased or decreased to match the impedance of different transmission lines. The termination resistance can also be varied to compensate for changes in the resistors caused by temperature variations on the integrated circuit or other factors.

20 Claims, 3 Drawing Sheets

U.S. PATENT DOCUMENTS

| | | | |
|---|---|---|---|
| 5,955,911 | A | 9/1999 | Drost et al. |
| 5,970,255 | A | 10/1999 | Tran et al. |
| 6,008,665 | A | 12/1999 | Kalb et al. |
| 6,026,456 | A | 2/2000 | Ilkbahar |
| 6,037,798 | A | 3/2000 | Hedberg |
| 6,049,255 | A | 4/2000 | Hagberg et al. |
| 6,064,224 | A | 5/2000 | Esch, Jr. et al. |
| 6,087,847 | A | 7/2000 | Mooney et al. |
| 6,097,208 | A | 8/2000 | Okajima et al. |
| 6,100,713 | A | 8/2000 | Kalb et al. |
| 6,118,310 | A | 9/2000 | Esch, Jr. |
| 6,147,520 | A | 11/2000 | Kothandaraman et al. |
| 6,154,060 | A | 11/2000 | Morriss |
| 6,157,206 | A | 12/2000 | Taylor et al. |
| 6,181,157 | B1 | 1/2001 | Fiedler |
| 6,236,231 | B1 | 5/2001 | Nguyen et al. |
| 6,252,419 | B1 | 6/2001 | Sung et al. |
| 6,329,836 | B1 | 12/2001 | Drost et al. |
| 6,356,106 | B1 | 3/2002 | Greeff et al. |
| 6,362,644 | B1 | 3/2002 | Jeffery et al. |
| 6,366,128 | B1 | 4/2002 | Ghia et al. |
| 6,411,126 | B1 | 6/2002 | Tinsley et al. |
| 6,414,512 | B1 | 7/2002 | Moyer |
| 6,424,169 | B1 | 7/2002 | Partow et al. |
| 6,433,579 | B1 | 8/2002 | Wang et al. |
| 6,445,245 | B1 | 9/2002 | Schultz et al. |
| 6,448,813 | B2 | 9/2002 | Garlepp et al. |
| 6,466,063 | B2 | 10/2002 | Chen |
| 6,489,837 | B2 | 12/2002 | Schultz et al. |
| 6,586,964 | B1 | 7/2003 | Kent et al. |
| 6,590,413 | B1 | 7/2003 | Yang |
| 6,603,329 | B1 | 8/2003 | Wang et al. |
| 6,639,397 | B2 | 10/2003 | Roth et al. |
| 6,642,741 | B2 | 11/2003 | Metz et al. |
| 6,747,475 | B2 * | 6/2004 | Yuffe et al. .................. 326/30 |
| 2002/0010853 | A1 | 1/2002 | Trimberger et al. |
| 2002/0060602 | A1 | 5/2002 | Ghia et al. |
| 2002/0101278 | A1 | 8/2002 | Schultz et al. |
| 2003/0062922 | A1 | 4/2003 | Douglass et al. |
| 2004/0008054 | A1 | 1/2004 | Lesea et al. |

OTHER PUBLICATIONS

Boni, A. et al. (2001). "LVDS I/O Interface for GB/s-per--Pin Operation in 0.35-um CMOS," IEEE Journal of Solid-State Circuits, 36(4):706-711.

Esch and Manley, Theory and Design of CMOS HSTL I/O Pads, The Hewlett Packard Journal, Aug. 1998.

Xilinx, "Spartan-3 1.2V FPGA Family: Functional Description," Xilinx, DS099-2 (v1.2) Jul. 11, 2003.

Xilinx, "Virtex-II 1.5V Field Programmable Gate Arrays," Xilinx, DSO3102 (v1.5), Apr. 2, 2001.

Xilinx, "Virtex-II Platform FPGAs: Detailed Description," Xilinx, DS031-2 (v3.1) Oct. 14, 2003.

Xilinx, "Virtex-II Pro Platform FPGAs: Functional Description," Xilinx, DS083-2 (v2.9) Oct. 14, 2003.

* cited by examiner

DYNAMICALLY ADJUSTABLE TERMINATION IMPEDANCE CONTROL TECHNIQUES

BACKGROUND OF THE INVENTION

This patent application relates to on-chip impedance termination circuits, and more particularly, to on-chip impedance termination circuits that are programmable and dynamically adjustable.

Integrated circuits have input/output (IO) pins that are used to transmit signals into and out of the circuit. An external termination resistor can be coupled to each IO pin to provide impedance termination. An impedance termination resistor reduces reflection of input signals on a transmission line coupled to an IO pin. Signal reflection causes signal distortion and degrades overall signal quality. A termination resistor can be selected to match the impedance of a transmission line to eliminate or reduce reflection.

The use of external resistors for termination purposes can be cumbersome and costly, especially for integrated circuits that have numerous IO pins. For example, external resistors typically use a substantial amount of board space. External resistors also degrade signal quality because of the lumped capacitance associated with physically mounting (or soldering) the resistor on the board. The lumped capacitance doesn't behave as a transmission line and may increase impedance mismatch.

To address some of the problems with external termination resistors, on-chip impedance termination techniques have been developed. Prior art integrated circuits have provided on-chip impedance termination by coupling an on-chip resistor to an IO pin. The on-chip resistor can be formed from polysilicon. The resistance of an on-chip polysilicon resistor can vary more than 30% across the standard operating temperatures of an integrated circuit (e.g., −5° C. to 120° C.). Variations in other technology parameters such as supply voltage can also causes substantial variations in the resistance values of on-chip polysilicon termination resistors.

Another problem with prior art on-chip termination resistors is that their resistance values are fixed. Different IO standards require different termination resistances to match the impedance of different transmission lines.

Therefore, it would be desirable to provide on-chip impedance termination circuits that can be dynamically adjusted to match the impedance of different transmission lines and varying operating conditions.

BRIEF SUMMARY OF THE INVENTION

The present invention provides techniques for dynamically adjustable on-chip impedance termination circuits. The present invention allows for real-time adjustment of on-chip programmable termination impedance. For example, a user can build a feedback circuit based on an algorithm programmed into an integrated circuit. The feedback circuit can sense a condition in the integrated circuit (such as temperature) and automatically adjust the on-chip termination impedance in real-time to account for changes in the condition.

The termination impedance circuits of the present invention include networks of resistors on an integrated circuit that provide termination impedance to transmission lines coupled to IO pins. The termination resistors are coupled in series and in parallel with each other. Pass gates are coupled to the resistors. The pass gates are individually turned ON to couple resistors to the IO pin. The pass gates are individually turned OFF to decouple resistors from the IO pin. Each pass gate is set to be ON or OFF to provide a selected termination resistance value to a transmission line coupled to the IO pin.

The present invention can also generate different termination resistance values at each IO pin. Also, the termination resistance values can be adjusted to accommodate changes in temperature, voltage, and other factors. The termination resistance values can be increased or decreased to match the impedance of different transmission lines.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1A:
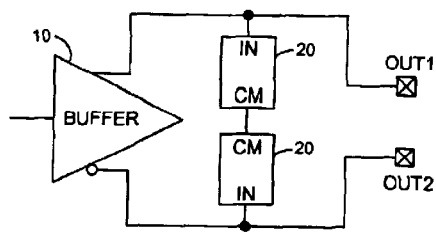
FIGS. 1A–1B are block diagrams of dynamically adjustable impedance termination circuits coupled to output pins on an integrated circuit according to embodiments of the present invention.

FIG. 1A illustrates a block diagram of two dynamically adjustable termination impedance circuits 20 on an integrated circuit according to an embodiment of the present invention. An integrated circuit of the present invention can include, for example, an application specific integrated circuit (ASIC), a programmable logic device (PLD), a field programmable gate array (FPGA), a programmable gate array (PLA), or a configurable logic array.

OUT1 and OUT2 are differential output pins of the integrated circuit. Buffer 10 is a differential driver circuit that drives differential signals out of the integrated circuit and onto transmission lines that are coupled to pins OUT1 and OUT2.

Termination impedance circuits 20 are coupled together at their common mode (CM) terminals. Termination impedance circuits 20 are coupled to pins OUT1 and OUT2 at their IN terminals. Circuits 20 are coupled in parallel with transmission lines connected to pins OUT1 and OUT2. Thus, circuits 20 provide parallel termination impedance at differential pins OUT1 and OUT2.

Figure 1B:
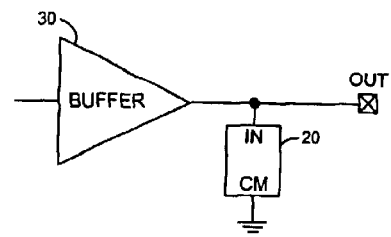

Termination impedance circuit 20 can also provide termination impedance to a single-ended output pin OUT as shown in FIG. 1B. In the embodiment of FIG. 1B, circuit 20 is coupled between output pin OUT and ground. The IN terminal of circuit 20 is coupled to OUT, and the CM terminal of circuit 20 is coupled to ground. Buffer 30 is a single-ended driver circuit that drives single-ended signals onto a transmission line coupled to OUT. Circuit 20 provides parallel termination impedance to the transmission line coupled to OUT.

Figure 2A:
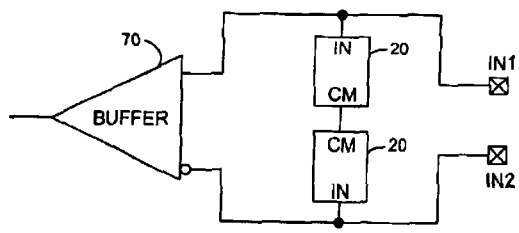
FIGS. 2A–2B are block diagrams of dynamically adjustable impedance termination circuits coupled to input pins on an integrated circuit according to embodiments of the present invention.

Termination impedance circuit 20 can also provide termination impedance to input pins as shown in FIGS. 2A–2. In FIG. 2A, IN1 and IN2 are differential input pins of the integrated circuit. Buffer 70 is a differential driver circuit that drives differential input signals from IN1 and IN2 into the integrated circuit. Termination impedance circuits 20 are coupled in parallel with transmission lines connected to pins IN1 and IN2. Thus, circuits 20 provide parallel termination impedance at differential pins IN1 and IN2.

Figure 2B:
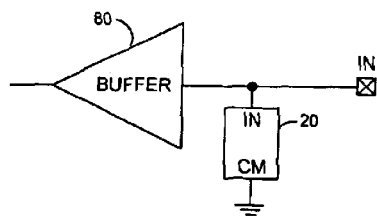

In the embodiment of FIG. 2B, circuit 20 is coupled between input pin IN and ground. The IN terminal of circuit 20 is coupled to OUT, and the CM terminal of circuit 20 is coupled to ground. Buffer 80 is a single-ended driver circuit that drives single-ended input signals into the integrated circuit. Circuit 20 provides parallel termination impedance to the transmission line coupled to IN.

Figure 3:
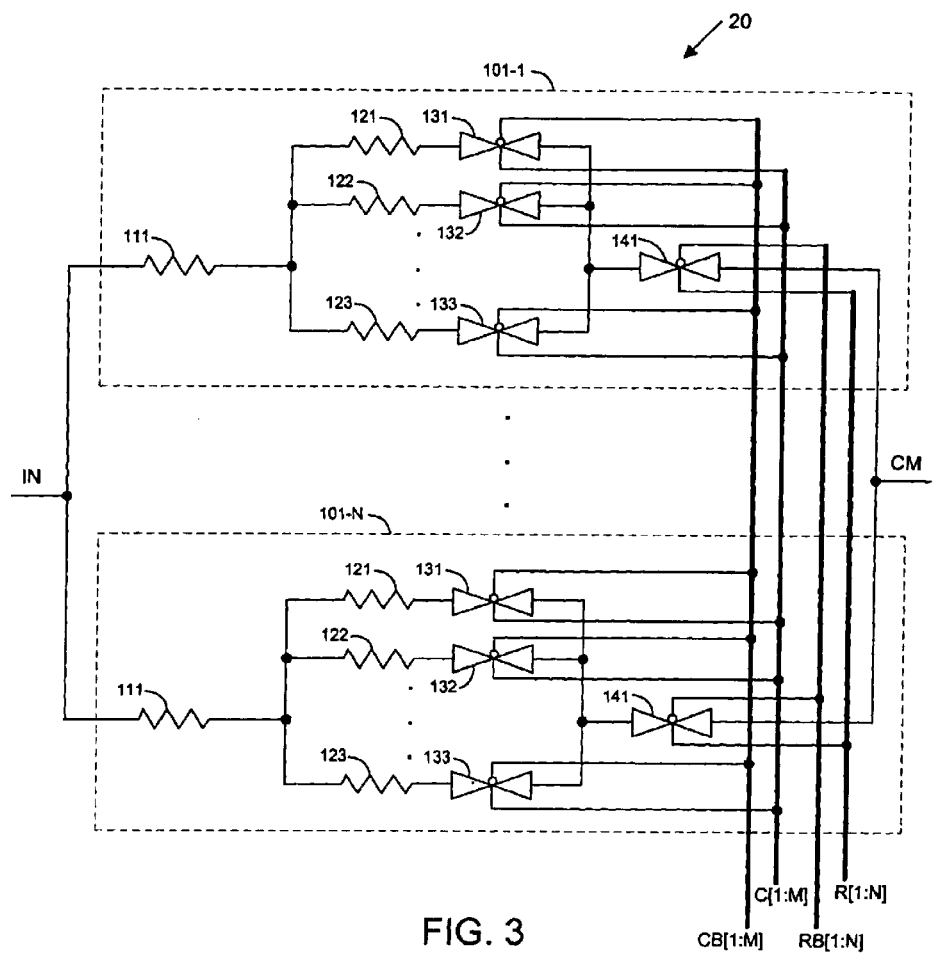
FIG. 3 is a schematic of a dynamically adjustable on-chip termination impedance circuit according to an embodiment of the present invention.

FIG. 3 illustrates a detailed schematic of dynamically adjustable termination impedance circuit 20 according to an embodiment of the present invention. Termination circuit 20 includes multiple resistor networks 101. Two resistor networks 101 are shown in FIG. 3 as an example and to simplify the drawing. Termination circuit 20 can include any number N of resistor networks 101-I through 101-N. For example, circuit 20 can include 1, 3, 4, 5, 6, 7, or 10 resistor networks 101. Resistor networks 101 are coupled in parallel between the IN and CM terminals or termination impedance circuit 20.

Each of resistor networks 101 includes multiple on-chip resistors. For example, on-chip resistors 111, 121, 122, and 123 are shown in FIG. 3. Each resistor network 101 can include any number of resistors. Four resistors are shown in FIG. 3 merely as one example of the present invention.

Resistor network 101 also includes multiple pass gates. For example, pass gates 131, 132, 133, and 141 are shown in FIG. 3. Each of pass gates 131–133 is coupled in series with one of resistors 121–123, as shown in FIG. 3. Pass gate 141 is coupled in series with resistor 111 and resistors 121–123.

Pass gates 141 are controlled by control signals R[1:N] and complimentary signals RB[1:N], where N is the number of resistor networks 101 inside circuit 20. Thus, there are two voltage signals R and RB for each pass gate 141 in circuit 20. Signals R and RB are programmed to select which of resistor networks 101 will be enabled to conduct current between terminals IN and CM.

Pass gates 141 and pass gates 131–133 can include two CMOS pass transistors (a p-channel FET and an n-channel FET) coupled in parallel. Voltage signals R control the n-channel transistors within each of the pass gates 141, and voltage signals RB control the p-channel transistors within each of the pass gates 141. According to further embodiments of the present invention, pass gates 141 and 131–133 each include only one pass transistor. In other embodiments, pass gates 141 and 131–133 each include three or more pass transistors.

For example, when signal R1 is HIGH, and signal RB1 is LOW, pass gate 141 in network 101-1 is ON. When signal R1 is LOW, and signal RBN is HIGH, pass gate 141 in network 101-1 is OFF.

Any of pass gates 141 can be turned ON to enable a corresponding one of resistor networks 101. When a pass gate 141 in a particular resistor network 101 is OFF, current flow through that resistor network 101 is blocked.

Pass gates 131–133 in each of resistor networks 101 are controlled by control signals C[1:M] and complimentary signals CB[1:M]. M is the total number of pass gates 131–133 within circuit 20. Voltage signals C control the n-channel transistors within pass gates 131–133, and voltage signals CB control the p-channel transistors within pass gates 131–133.

For example, when signal C1 is HIGH, and signal CB1 is LOW, pass gate 131 is network 101-1 is ON. When signal C1 is LOW, and signal CB2 is LOW, pass gate 132 is ON. When signal C2 is LOW, and signal CB2 is HIGH, pass gate 132 is OFF.

Any of pass gates 131–133 in circuit 20 (and any other pass gates) can be turned ON to couple a current path through resistors 121–123, respectively, using signals C and CB. For example, pass gate 133 can be turned ON to provide a current path through resistor 123 in one of networks 101. Any of pass gates 131–133 in circuit 20 can be turned OFF to block a current path through resistors 121–123, respectively, using signals C and CB. For example, pass gate 132 can be turned OFF to block current through resistor 122 in one of the networks 101.

By turning ON pass gate 141 and one or more of pass gates 131–133 in one of resistor networks 101, a current path is opened up between terminals IN and CM in that network 101. Current can flow through resistor 111 and one or more of resistors 121–123. A user of the integrated circuit can block current flow through any one of networks 101 in circuit 20 by turning OFF a corresponding one of pass gates 141.

Because resistor networks 101 are coupled in parallel with each other, the net resistance of circuit 20 can be reduced by turning ON more of pass gates 141. As current paths through more of networks 101 are opened up, the net resistance of circuit 20 decreases. Conversely, the net resistance of circuit 20 can be increased by turning OFF more of pass gates 141.

The net resistance of circuit 20 can also be reduced by turning ON more of pass gates 131–133, because resistors 121–123 are coupled together in parallel. Conversely, the net resistance of circuit 20 can be increased by turning OFF more of pass gates 131–133. The minimum resistance of circuit 20 can be achieved by turning ON all of the pass gates 141 and 131–133 in circuit 20 to provide the maximum number of current paths.

As user of the integrated circuit can control signals C, CB, R, and RB to set the net resistance of termination impedance circuit 20 to match the impedance of a transmission line. Pass gates 141 and 131–133 are turned ON or OFF to set the net resistance of circuit 20 to match the transmission line impedance.

One or more termination impedance circuits can be coupled to every IO pin on an integrated circuit, as shown for example, in FIGS. 1 and 2. Thus, the present invention provides techniques for setting the on-chip termination impedance to terminate transmission lines coupled to the IO pins. The net resistance of each circuit 20 can be programmed independently. Therefore, the on-chip termination impedance provided to each IO pin can be set to a different value to match each unique transmission line.

The present invention allows for real-time adjustment of on-chip termination impedance. For example, a user can build a feedback circuit based on an algorithm programmed into an integrated circuit. The feedback circuit can also take data from the transmission channel to determine whether the on-chip termination impedance is continuing to match the transmission line impedance. If the feedback circuit senses any changes in the on-chip termination impedance, the feedback circuit can dynamically adjust the on-chip termination impedance in real-time to compensate for these changes.

For example, as the temperature or the supply voltage of the integrated circuit changes, the resistance of resistors 111 and 121–123 also changes. Resistors 111 and 121–123 can be made, for example, of polysilicon. The feedback circuit senses the change in the termination impedance. The feedback circuit then causes or more pass gates 131–133 change state (i.e., turned ON or OFF) so that the net resistance of circuit 20 continues to match the transmission line impedance.

The feedback circuit generates control signals C, CB, R, and RB to dynamically adjust the on-chip termination impedance through gates 131–133 in circuit 20. These control signals also can be generated by other circuitry on the integrated circuit. For example, these control signals can be stored in a control RAM (CRAM) blocks on a field programmable gate array. These control signals can also be generated by programmable logic elements on a field programmable gate array. A user of the integrated circuit can program the logic elements and the CRAM blocks to generate the control signals that set the net resistance of termination impedance circuits 20. The logic elements and CRAM can be reprogrammed to change the net resistance of circuit 20. Alternatively, the user can set the values of signals C, CB, R, and RB through an input pin.

Pass gates 141 generally do not change state in response to temperature changes. Turning pass gates 141 ON or OFF causes larger changes in the net resistance of circuit 20, because gates 141 control current to several resistors. The changes caused by temperature and voltage variations are usually small. Smaller changes in the net resistance can be achieved merely by changing the state of one or more of pass gates 131–133. Therefore, the present invention provides techniques for dynamically compensating for variations in the resistances of on-chip termination resistors (caused by temperature changes, etc.) by controlling gates 131–133.

Figure 4:
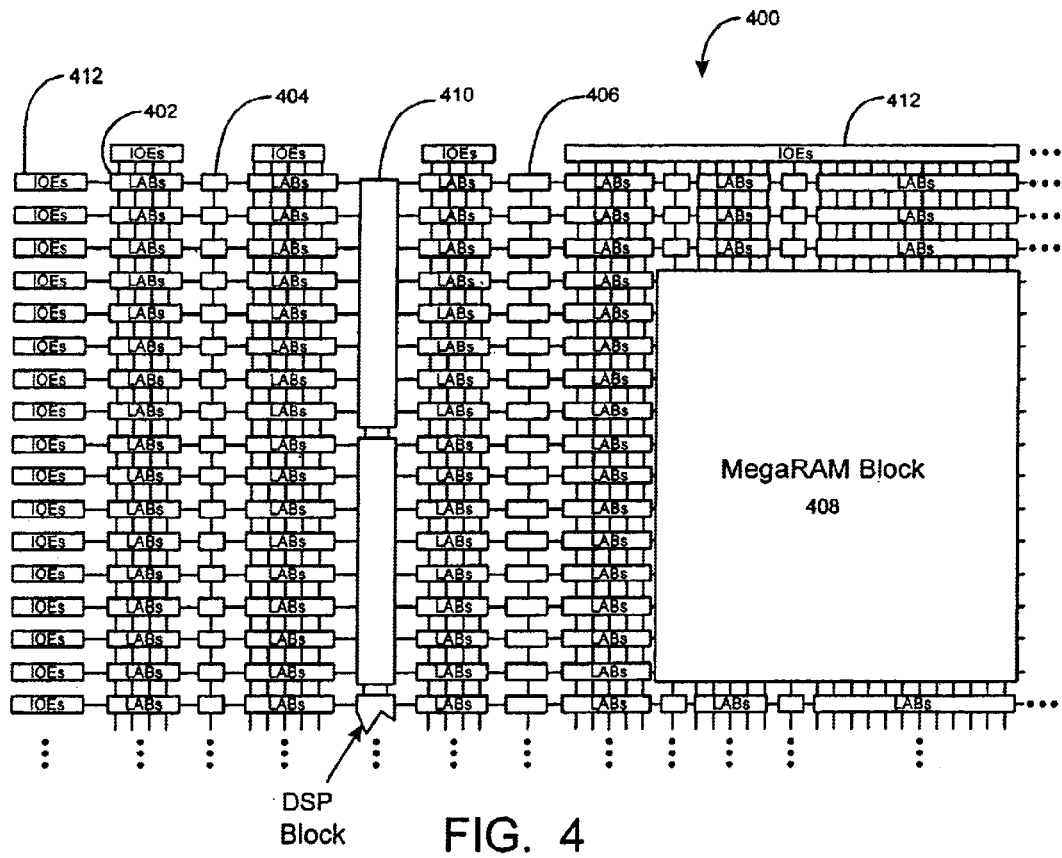
FIG. 4 is a simplified block diagram of a programmable logic device that can implement embodiments of the present invention.

Further details of an exemplary field programmable gate array that can be used to implement the techniques of the present invention is now discussed. FIG. 4 is a simplified partial block diagram of an exemplary high-density PLD/FPGA 400 that can be used to implement the present invention. PLD 400 includes a two-dimensional array of programmable logic array blocks (or LABs) 402 that are interconnected by a network of column and row interconnects of varying length and speed. LABs 402 include multiple (e.g., 10) logic elements (or LEs), an LE being a small unit of logic that provides for efficient implementation of user defined logic functions.

PLD 400 also includes a distributed memory structure including RAM blocks of varying sizes provided throughout the array. The RAM blocks include, for example, 512 bit blocks 404, 4K blocks 406 and a MegaBlock 408 providing 512K bits of RAM. These memory blocks may also include shift resistors and FIFO buffers. PLD 400 further includes digital signal processing (DSP) blocks 410 that can implement, for example, multipliers with add or subtract features. I/O elements (IOEs) 412 located, in this example, around the periphery of the device support numerous single-ended and differential I/O standards. It is to be understood that PLD 400 is described herein for illustrative purposes only and that the present invention can be implemented in many different types of PLDs, FPGAs, and the like.

Figure 5:
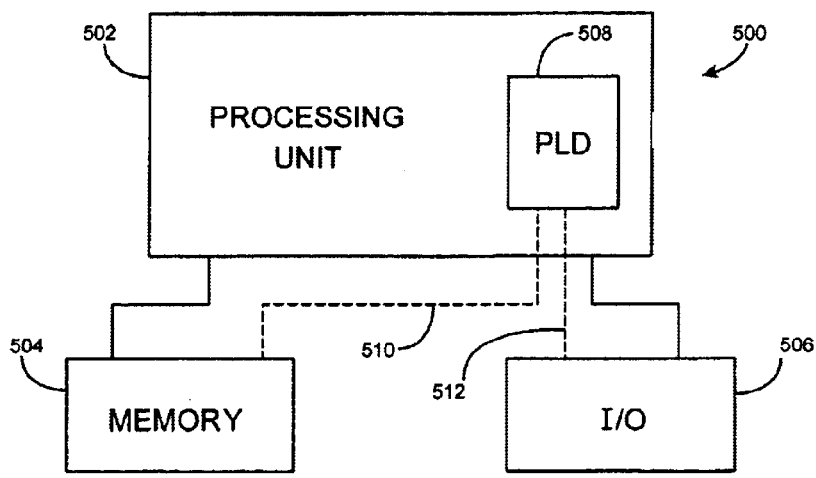
FIG. 5 is a block diagram of an electronic system that can implement embodiments of the present invention.

While PLDs of the type shown in FIG. 4 provide many of the resources required to implement system level solutions, the present invention can also benefit systems wherein a PLD is one of several components. FIG. 5 shows a block diagram of an exemplary digital system 500, within which the present invention may be embodied. System 500 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 500 may be provided on a single board, on multiple boards, or within multiple enclosures.

System 500 includes a processing unit 502, a memory unit 504 and an I/O unit 506 interconnected together by one or more buses. According to this exemplary embodiment, a programmable logic device (PLD) 508 is embedded in processing unit 502. PLD 508 may serve many different purposes within the system in FIG. 5. PLD 508 can, for example, be a logical building block of processing unit 502, supporting its internal and external operations. PLD 508 is programmed to implement the logical functions necessary to carry on its particular role in system operation. PLD 508 may be specially coupled to memory 504 through connection 510 and to I/O unit 506 through connection 512.

Processing unit 502 may direct data to an appropriate system component for processing or storage, execute a program stored in memory 504 or receive and transmit data via I/O unit 506, or other similar function. Processing unit 502 can be a central processing unit (CPU), microprocessor, floating point coprocessor, graphics coprocessor, hardware controller, microcontroller, programmable logic device programmed for use as a controller, network controller, and the like. Furthermore, in many embodiments, thee is often no need for a CPU.

For example, instead of a CPU, one or more PLDs 508 can control the logical operations of the system. In an embodiment, PLD 508 acts as a reconfigurable processor, which can be reprogrammed as needed to handle a particular computing task. Alternately, programmable logic device 508 may itself include an embedded microprocessor. Memory unit 504 may be a random access memory (RAM), read only memory (ROM), fixed or flexible disk media, PC Card flash disk memory, tape, or any other storage means, or any combination of these storage means.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications can be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. An integrated circuit comprising a plurality of dynamically adjustable impedance termination circuits that are coupled together in parallel to a first pin, each of the impedance termination circuits comprising:

first resistors coupled in parallel;

a second resistor coupled in series with the first resistors;

first pass gates each coupled in series with one of the first resistors and each coupled to a first control signal; and a second pass gate coupled to the first pass gates and coupled to receive a second control signal.

2. The integrated circuit according to claim 1 wherein the first resistors comprise three resistors coupled in parallel.

3. The integrated circuit according to claim 1 wherein the integrated circuit comprises three of the impedance termination circuits coupled together in parallel to the first pin.

4. The integrated circuit according to claim 1 wherein each of the first pass gates and the second pass gates comprise a p-channel transistor and an n-channel transistor coupled together in parallel.

5. The integrated circuit according to claim 1 wherein the integrated circuit includes a second set of impedance termination circuits that are coupled together in parallel to a second pin, the first and the second pin being differential input/output pins.

6. A method for providing dynamically adjustable on-chip termination impedance to a first input/output pin on an integrated circuit, the method comprising:

controlling first current paths through first on-chip resistors that coupled together in parallel using first pass gates, each first pass gate being coupled in series with one of the first on-chip resistors;

providing a second current path through the first on-chip resistors and a second on-chip resistor that is coupled in series with the first on-chip resistors by turning ON a second pass gate;

providing a third current path through a third on-chip resistor that is coupled in parallel with the first and second on-chip resistors by turning ON a third pass gate, wherein the second and the third resistors are coupled to the first pin;

sensing the on-chip termination impedance; and dynamically adjusting the on-chip termination impedance by changing states of the first pass gates.

7. The method of claim 6 further comprising:

coupling fourth on-chip resistors together in parallel by turning ON fourth pass gates, each fourth pass gate being coupled in series with one of the fourth resistors, wherein the fourth on-chip resistors are coupled in series with the third resistor and the second current path flows through the four resistors.

8. The method of claim 7 further comprising:

blocking current through a fifth resistor coupled in parallel with the first and the second on-chip resistors by turn OFF a fifth pass gate.

9. The method of claim 7 further comprising:

blocking current through a selected one of the fourth resistors by turning OFF one of the fourth pass gates that is coupled to the selected fourth resistor.

10. The method of claim 6 further comprising:

blocking current through a selected one of the first resistors by turning OFF one of the first pass gates that is coupled the selected first resistor.

11. The method of claim 6 further comprising:

decoupling a third on-chip resistor from the first on-chip resistors by turning OFF a third pass gate; and blocking a fourth current path through a fourth on-chip resistor that is coupled in parallel with the first and the second on-chip resistors by turning OFF a fourth pass gate.

12. The method of claim 6 wherein the integrated circuit is a field programmable gate array.

13. The method of claim 6 further comprising providing on-chip termination impedance to a second input/output pin on the integrated circuit by:

coupling fourth on-chip resistors together in parallel by turning ON fourth pass gates, each fourth pass gate being coupled in series with one of the fourth on-chip resistors;

providing a fourth current path through the fourth on-chip resistors and a fifth on-chip resistor coupled in series with the fourth on-chip resistors by turning ON a fifth pass gate, wherein the first and the second pins are differential pins.

14. An integrated circuit comprising a first dynamically adjustable on-chip impedance termination circuit, wherein the first impedance termination circuit comprises:

means for coupling together first resistors in parallel in response to first control signals;

means for providing a first current path through a second resistor coupled in series with the first resistors in response to a second control signal; and means for providing a second current path through a third resistor coupled in parallel with the first resistors and the second resistor in response to a third control signal, wherein the first, second, and third resistors provide termination impedance at a pin.

15. The integrated circuit as defined in claim 14 further comprising:

means for blocking current through a fourth on-chip resistor that is coupled to the second and third on-chip resistors in response to a fourth control signal.

16. The integrated circuit as defined in claim 14 further comprising:

means for blocking current flow through one of the first resistors in response to a changed value of a corresponding one of the first control signals.

17. The integrated circuit as defined in claim 14 wherein the integrated circuit further comprises a second on-chip impedance termination circuit coupled to the first on-chip impedance termination circuit, wherein the second impedance termination circuit comprises:

means for coupling together fourth resistors in parallel in response to fourth control signals;

means for providing a third current path through a fifth resistor coupled in series with the fourth resistors in response to a fifth control signal; and means for providing a fourth current path through a sixth resistor coupled parallel with the fourth resistors and the fifth resistor in response to a sixth control signal, wherein the fourth, fifth, and sixth resistors provide termination impedance at a second pin.

18. The integrated circuit as defined in claim 14 wherein the integrated circuit is a programmable logic device.

19. The integrated circuit as defined in claim 14 further comprising:

means for coupling together fourth resistors in parallel in response to fourth control signals, wherein the second current path flows through the third and the fourth resistors.

20. The integrated circuit as defined in claim 19 further comprising:

means for providing a third current path through a fifth resistor coupled parallel with the fourth and the third resistors in response to a fifth control signal.

* * * * *